United States Patent [19]

Yoshida et al.

[11] Patent Number: 5,446,719
[45] Date of Patent: Aug. 29, 1995

[54] OPTICAL INFORMATION REPRODUCING APPARATUS

[75] Inventors: Yoshio Yoshida, Nara; Yukio Kurata, Tenri; Shigeki Tsuji, Higashihiroshima, all of Japan

[73] Assignee: Sharp Kabushiki Kaisha, Osaka, Japan

[21] Appl. No.: 13,038

[22] Filed: Feb. 3, 1993

[30] Foreign Application Priority Data

Feb. 5, 1992 [JP] Japan .................................. 4-020243
Aug. 26, 1992 [JP] Japan .................................. 4-227635

[51] Int. Cl.$^6$ .......................... G11B 7/00; G11B 7/13
[52] U.S. Cl. ............................. 369/116; 369/44.12; 369/112; 369/122; 369/44.37
[58] Field of Search .................. 369/44.12, 112, 116, 369/44.23, 109, 110, , 44.37, 121, 122; 372/8, 36, 46, 50

[56] References Cited

U.S. PATENT DOCUMENTS

| | | | |
|---|---|---|---|
| 5,105,403 | 4/1992 | Kando et al. | 369/112 |
| 5,111,447 | 5/1992 | Yamashita et al. | 369/112 |
| 5,111,449 | 5/1992 | Kurata et al. | 369/112 |
| 5,144,603 | 9/1992 | Mozume et al. | 369/44.14 |
| 5,144,604 | 9/1992 | Sugiura | 369/44.12 |
| 5,161,148 | 11/1992 | Hori et al. | 369/44.23 |
| 5,181,193 | 1/1993 | Kume et al. | 369/112 |
| 5,195,071 | 3/1993 | Funato et al. | 369/109 |
| 5,218,584 | 6/1993 | Gfeller | 369/44.12 |
| 5,233,580 | 8/1993 | Tanaka et al. | 369/44.12 |
| 5,247,506 | 9/1993 | Sugiura | 369/110 |
| 5,293,367 | 3/1994 | Kadowaki et al. | 369/44.12 |

FOREIGN PATENT DOCUMENTS

| | | |
|---|---|---|
| 1-150244 | 6/1989 | Japan . |
| 1-236436 | 9/1989 | Japan . |
| 1-241032 | 9/1989 | Japan . |
| 1-241033 | 9/1989 | Japan . |
| 2-121131 | 5/1990 | Japan . |

*Primary Examiner*—Georgia Y. Epps
*Assistant Examiner*—Kim-Kwok Chu
*Attorney, Agent, or Firm*—David G. Conlin; Kevin J. Fournier

[57] ABSTRACT

An optical information reproducing apparatus of the invention includes a light emitting and receiving unit and an optical system. The optical system converges light from the light emitting and receiving unit on a recording medium and converges the light after reflected by the recording medium. The light emitting and receiving unit includes: a semiconductor laser device disposed on a substrate for generating light; a photo detector formed, integrally with the substrate, on the substrate on which the semiconductor laser device is disposed, for outputting a signal corresponding to the intensity of light incident thereon; and a beam splitter provided on an optical axis of the reflected light, the beam splitter leading part of the reflected light to the photo detector.

23 Claims, 12 Drawing Sheets

ADHESIVE APPLICATION SUPERPOSITION

OPTICAL INFORMATION REPRODUCING APPARATUS

BACKGROUND OF THE INVENTION

1. Field of the Invention

The present invention relates to an optical information reproducing apparatus for reading information which has been recorded on an optical storage medium such as an optical recording medium or a magneto-optical disk by irradiating the optical storage medium with light, and a method of manufacturing the same.

2. Description of the Related Art

In recent years, optical storage mediums are widely used. Such optical storage mediums include, for example, an optical recording medium such as a CD-ROM (compact disk-read only memory) for reproduction only, a write-once type optical dick, and a rewritable optical disk. In an Optical information Reproducing apparatus utilizing such an optical storage medium, various types of optical pickup are used for reading information from said optical storage medium. There has been developed a technique by which the size, the weight and the price of the optical pickup are reduced. In the developed technique, by using diffraction devices having diffraction gratings formed by holography technique, the number of components of an optical system in the optical pickup is reduced.

An exemplary optical pickup having diffraction devices is shown in FIG. 10. Below the recording face of an optical recording medium 90 as the optical storage medium, a semiconductor laser device 100 is disposed. Light emitted from the semiconductor laser device 100 is incident on the optical recording medium 90 through a diffraction device 120, a diffraction device 130, a collimator lens 140, and en objective lens 150. At one side of the semiconductor laser device 100, a light receiving device 160 which outputs an electric signal corresponding to the intensity of the received light is disposed. In the optical recording medium 90, information is recorded in pits along a track 183.

A lens actuator (not shown) is connected to the objective lens 150. By the lens actuator, the objective lens 150 is moved in a focusing direction and a tracking direction. The focusing direction used herein is a direction in which the objective lens 150 is moved toward end away from the optical recording medium 90. The tracking direction used herein is a direction perpendicular to a direction along which the track 183 extends at a position irradiated by the light. By this movement, the light from the objective lens 150 is converged on the pit of the optical recording medium 90. In a case where the optical recording medium 90 is in a disk shape, the tracking direction is the radial direction of the optical recording medium 90.

The diffraction device 120 has a diffraction grating for diffracting the light emitted from the semiconductor laser device 100, whereby the emitted light is split into three beams, i.e., a main beam and two sub beams. The diffraction device 130 has two diffraction gratings 131 and 132 which are disposed in parallel along an X—X' direction parallel to the direction along which the track 183 of the optical recording medium 90 extends. The diffraction gratings 131 and 132 are respectively parallel to this X—X' direction. Between the diffraction gratings 131 and 132, a boundary 133 is formed which extends in a Y—Y' direction perpendicular to the direction along which the track 183 of the optical recording medium 90 extends. The light receiving device 160 is divided into five portions 161–165. The portions 161 and 162 are divided by a dividing line 166.

In such an optical pickup with the abovementioned construction, the laser light introduced into the diffraction device 120 from the semiconductor laser device 100 is diffracted with the diffraction device 120. As a result, the laser light is split into three beams, i.e., a zero-order diffracted beam as the main beam, plus/minus first-order diffracted beams as the sub beams. The thus obtained main beam and cub beams are further diffracted with the diffraction gratings 131 and 132 of the diffraction device 130. A zero-order diffracted beam as a main beam which is obtained by the diffraction in the respective diffraction gratings 131 and 132 is converged on the optical recording medium 90 through the collimator lens 140 and the objective lens 150.

After the light converged on the optical recording medium 90 is reflected from the optical recording medium 90, the reflected light is introduced into the diffraction device 130 through the objective lens 150 and the collimator lens 140. The reflected light is diffracted with the diffraction device 130. Diffracted light from the respective diffraction gratings 131 and 132 is incident onto the light receiving device 160. At this time, the first-order diffracted beam of the main beam obtained by the diffraction of the diffraction grating 131 is converged at the dividing line 166 and forms a light spot $R_1$. The main beam which is obtained by the diffraction of the diffraction grating 132 is converged on the portion 163 and forms a light spot $R_2$. The sub beams which are obtained by the diffraction of the respective diffraction gratings 131 and 132 are converged at four points, i.e., two points on the portion 164 and two points on the portion 165, and form light spots $R_3$–$R_6$.

Now, a focusing error of the converged spot on the optical recording medium 90 is explained. In a case where the light from the semiconductor laser device 100 is properly converged at an information pit on the optical recording medium 90, as is shown in FIG. 11B, the light spots $R_1$–$R_6$ each in a perfect circular shape are formed in the respective portions 161–165 and on the dividing line 166 of the light receiving device 160. In a case where the distance between the optical recording medium 90 and the objective lens 150 is smaller than the focal length, as is shown in FIG. 11A, the light spots $R_1$–$R_6$ each in an expanded semicircular shape are formed on the respective portions 161, 163, 164, and 165 of the light receiving device 160. In a case where the distance between the optical recording medium 90 end the objective lens 150 is larger than the focal length, as is shown in FIG. 11C, the light spots $R_1$–$R_6$ each in an expanded and inverted semicircular shape are formed in the respective portions 162, 163, 164, and 165 of the light receiving device 160.

A tracking error at the converged spot on the optical recording medium 90 is described with reference to FIGS. 10 and 12. The two sub beams are converged at positions which ere symmetrical with respect to the main beam as a point of symmetry and which ere displaced slightly in the Y—Y' direction and displaced somewhat more in the X—X' direction from the converged spot of the main beam. In a case where the main beam is properly converged on the track 183 in which the information pits are arranged on the optical recording medium 90, as is shown in FIG. 12B, the two cub beams at converged spots 181 and 182 are respectively incident on the track 183 in the same area. Therefore, the reflective intensities of the reflected beams from the optical recording medium 90 by the converged spots 181 and 182 are equal to each other. On the contrary, in a case where the converged spot 180 of the main beam 90 displaced with respect to the information pit of the optical recording medium 90 in the tracking direction, as is shown in FIG. 12A or 12C, the two sub beams at the converged spots 181 and 182 are respectively incident on the track 183 in different areas. Therefore, the reflective intensities of the reflected beams of the two sub beams from the optical recording medium 90 are different from each other.

From the portions 161-165 of the light receiving device 160 on which the light spots $R_1$-$R_6$ are formed, signals 81-85 corresponding to the intensities of the received beams are output, respectively. Based on the signals $S_1$-$S_5$, calculations ere performed between the signals by an electronic circuit element (not shown). Specifically, based on a difference $S_1$-$S_2$ between the signals $S_1$ and $S_5$, focusing error signal FES is calculated. Based on a difference $S_4$-$S_5$ between the signals $S_4$ and $S_5$, a tracking error signal TES is calculated. Based on the sum $S_1+S_2+S_3$ of the signals $S_1$, $S_2$, and $S_3$, an information signal RF is calculated.

In order to ensure that the recording end the reproduction of information are accurately performed, based on the focusing error signal FEB end the tracking error signal TES, the objective lens 150 is moved and the position thereof is adjusted by the lens actuator in both the focusing direction and the tracking direction. By this positioning, the emitted light from the semiconductor laser device 100 is accuretely converged on the information pits of the optical recording medium In the optical pickup having the construction shown in FIG. 10, as is shown in FIG. 13, the semiconductor laser device 100 and the light receiving device 160 are mounted at predetermined positions in a can package 185. In this situation, the can package 185 is airtightly sealed. To the upper surface of the can package 185, a transparent glass plate 186 is adhered. On the lower face of the glass plate 186, the first diffraction device 120 is formed by etching. On the upper face of the glass plate 186, the second diffraction device 130 is formed by etching. On the bottom face toward the inside of the can package 185, as is shown in FIG. 14, a stem 187 is provided. At one side of the stem 187, the semiconductor laser device 100 is mounted. On the upper face of the stem 187, the light receiving device 160 is mounted. On the bottom face of the can package 185, a photo detector 188 for monitoring optical power which detects the power level of the laser light from the semiconductor laser device 100 is provided adjacently to the stem 187. Based on the output from the photo detector 188, the semiconductor laser device 100 is controlled so as to provide a constant output.

In the above-mentioned conventional optical pickup, the semiconductor laser device 100 and the light receiving device 160 are separately and independently fabricated, and then the semiconductor laser device 100 and the light receiving device 160 are fixed on the different faces of the stem 187. Accordingly, it is difficult to match the positions Of the semiconductor laser device 100 and the light receiving device 160 with high accuracy, and the relative positions thereof are likely to be shifted. Specifically, it is very difficult to suppress the error in the height direction to several tens of micrometers or smaller. In a control signal such as the .focusing error signal FES end the tracking error signal TES, an offset component caused by the errors in the height direction of both the devices can be eliminated by positioning the diffraction device 130. However, if the offset component is too large, some improper conditions occur such as that the waveform of the control signal is distorted by the positioning. Since the .semiconductor laser device 100 and the light receiving device 160 are provided on the separate faces of the stem 187, the can package 185 cannot be made thinner, This prevents the optical pickup from being reduced in size, The electronic circuit element for calculating the output signal from the photo detector 188 is usually provided on a wiring board which is different from the wiring board on which the optical pickup is provided. In this case, for example, the signal frequency of a reproduced information signal from a compact disk is in the vicinity of 1 MHz, and the signal frequency of a reproduced information signal from a laser disk is in the vicinity of 2 MHz. That is, the reproduced information signal is a high-frequency signal, which means that the reproduced information signal may easily include noise. Therefore, it is necessary to take sufficient care in designing wirings.

In the conventional optical pickup, the semiconductor laser device 100 and the light receiving device 160 are separately and independently fabricated, and then attached onto the Same stem 187. Therefore, a registration error of about several tens of micrometers occurs between the semiconductor laser device 100 and the light receiving device 160. Accordingly, it is necessary to compensate an offset component in a control signal caused by the registration error, by adjusting the position of the diffraction device 130. In the process for adjusting the position of the diffraction device 130, it is necessary to actually reproduce the information from the optical recording medium 90. Moreover, the offset amounts vary depending on the employed optical pickups. Therefore, the assembling process in manufacturing the optical pickup is complicated, which prevents the optical pickup from being produced at lower cost and from having a higher quality.

Moreover, in the conventional optical pickup, since the semiconductor laser device 100 is mounted on the side face of the square stem 187, the can package 185 is large in size, which prevents the optical pickup from being reduced in size.

SUMMARY OF THE INVENTION

The optical information reproducing apparatus of this invention includes a light emitting and receiving unit and an optical system, wherein the optical system converges light from the light emitting and receiving unit on a recording medium and converges the light after reflected by the recording medium, end wherein the light emitting and receiving unit includes: light generating means disposed on a substrate for generating the light; photo detecting means formed, integrally with the substrate, on the substrate on which the light generating means is disposed, for outputting a signal corresponding to the intensity of light incident thereon; and beam splitting means provided on an optical axis of the reflected light, the beam splitting means leading part of the reflected light to the photo detecting means.

According to another aspect of the present invention, a method of manufacturing an optical information reproducing apparatus is provided. The method includes the steps of: (A) monolithically forming, on a semiconductor substrate, a plurality of light generating means for generating light and a plurality of photo detecting means each for outputting a signal corresponding to the intensity of light incident thereon, the plurality of photo detecting means being disposed adjacently to the plurality of the light generating means: (B) mounting, on the semiconductor substrate, a light diffraction member including a plurality of light diffraction devices formed therein by which the light generated from the plurality of light generating means is diffracted and emitted, and by which the incident light is diffracted to illuminate the plurality of photo detecting means, respectively; and (C) adjusting intervals between the plurality of light diffraction devices and the plurality of light generating means, and intervals between the plurality of light diffraction devices end the plurality of photo detecting means, by moving the light diffraction member, respectively.

Alternatively, a method of manufacturing an optical information reproducing apparatus of the present invention includes the steps of: (A) monolithically forming, on a semiconductor substrate, a plurality of photo detecting means for outputting a signal corresponding to the intensity of light incident thereon; (B) providing, on the semiconductor substrate, a plurality of light generating means for generating light, the plurality of light generating means is disposed adjacently to the plurality of photo detecting means, respectively; (C) mounting, on, the semiconductor substrate, a light diffraction member including a plurality of light diffraction devices formed therein by which the light generated from the plurality of light generating means are diffracted and emitted, and by which the incident light is diffracted to illuminate the plurality of photo detecting means, respectively; and (D) adjusting intervals between the plurality of light diffraction devices and the plurality of light generating means, and intervals between the plurality of light diffraction devices and the plurality of photo detecting means, by moving the light diffraction member, respectively.

In the optical information reproducing apparatus and the method for manufacturing the same according to the invention, the light from the light generating means is converged on the recording medium. The light reflected from the recording medium is converged on the photo detecting means through the optical system and the light splitting means. In the optical information reproducing apparatus of the invention, since the photo detecting means and the light generating means are fabricated on one and the same substrate integrally with the substrate, the shift in relative positions of the means is very small and can be suppressed to several micrometers. Therefore, the offset component which is caused in the control signal is remarkably suppressed as compared with the prior art, so that the positioning of the light diffraction member is not required. Even when the positioning is performed, it is necessary to monitor only a signal output from a single light emitting and receiving unit among a number of light emitting and receiving units fabricated on the substrate, so as to simultaneously adjust the distances between the light diffraction devices and all the light emitting and receiving units on the substrate. Therefore, the productivity of the optical information reproducing apparatus is improved, and the cost thereof is lowered while the high quality thereof is achieved.

Thus, the invention described herein makes possible the advantages of (1) providing a small-sized and light-weight optical information reproducing apparatus with high reliability in its information reproducing operation, and (2) providing a manufacturing method for such an optical information reproducing apparatus in which the registration between devices is easily performed and which can attain an improved production efficiency.

These and other advantages of the present invention will become apparent to those skilled in the art upon reading and understanding the following detailed description with reference to the accompanying figures.

DESCRIPTION OF THE PREFERRED EMBODIMENTS

Hereinafter, a first example of the present invention will be described.

Figure 1:
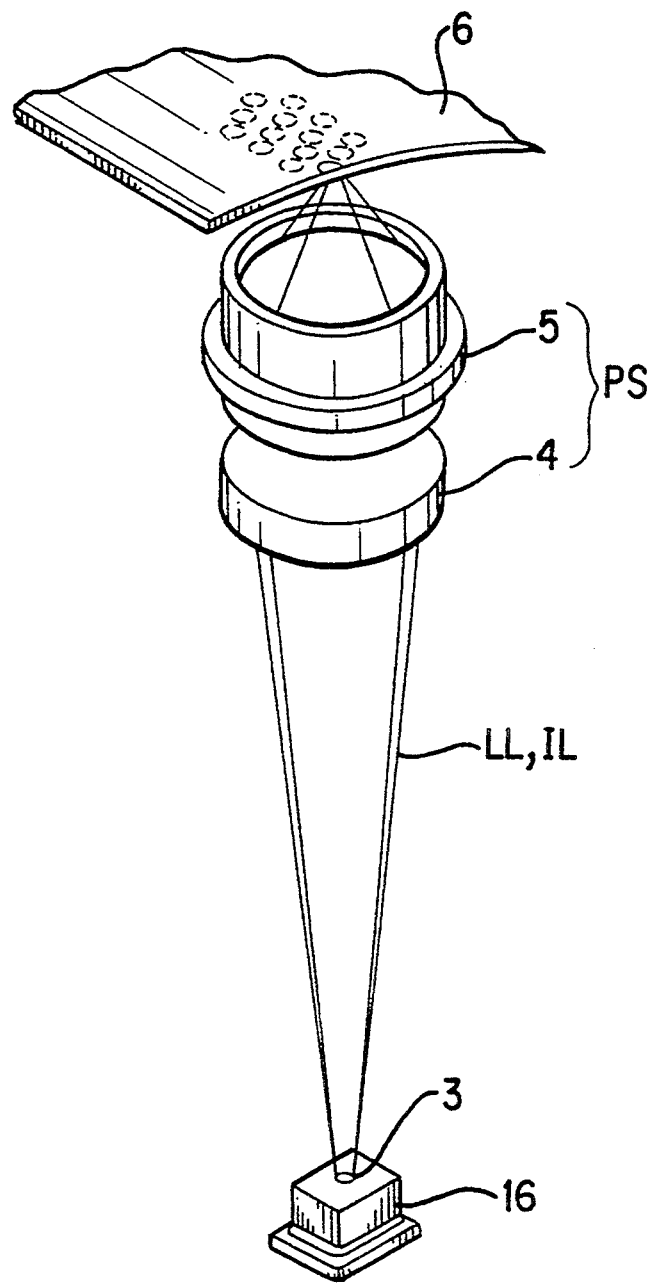
FIG. 1 is a perspective view showing an optical pickup in an optical information reproducing apparatus of one example according to the present invention.

FIG. 1 shows the first example in which the optical information reproducing apparatus of the present invention is applied to an optical pickup.

The optical pickup is provided with a light emitting and receiving unit 16 and an optical system PS. The light emitting and receiving unit 16 includes a semiconductor laser device 1 as light emitting means, and a photo detector 7 for detecting reflected light LL. The optical system PS includes a collimator lens 4 and an objective lens 5 for converging the light from the semiconductor laser device 1 on an optical recording medium (for example, an optical disk), and for converging the reflected light LL from the optical recording medium 6.

Figure 2:
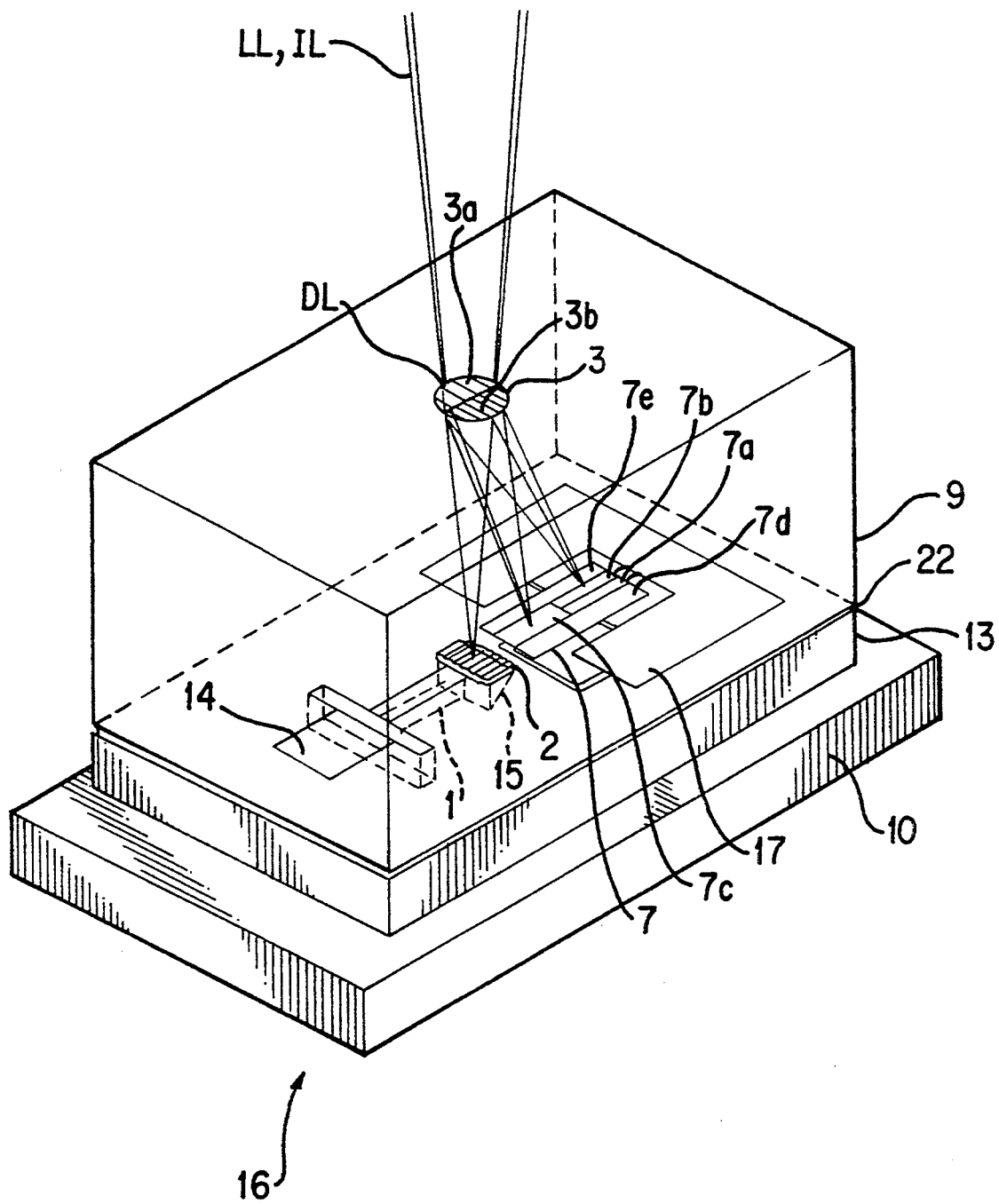
FIG. 2 is an enlarged perspective view of a light emitting and receiving unit in the example.
Figure 3:
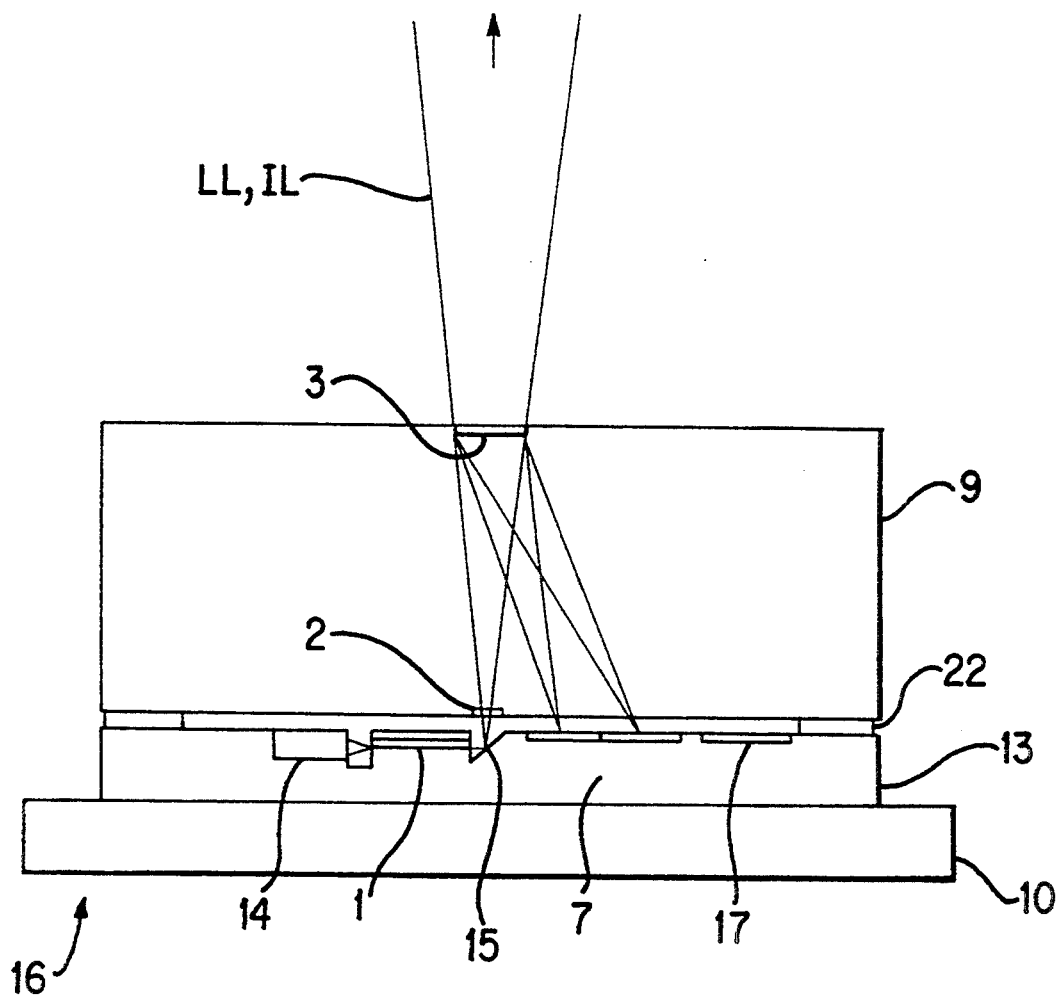
FIG. 3 is an enlarged cross-sectional view of the light emitting and receiving unit in the example.

The specific construction of the light emitting and receiving unit 16 is shown in FIGS. 2 and 3. The light emitting and receiving unit 16 includes a ceramic substrate 10. On the ceramic substrate 10, a semiconductor integrated chip 13 and a holographic optical element 9 are attached. As to the semiconductor integrated chip 13, on the same semiconductor integrated chip 13, the semiconductor laser device 1 and the photo detector 7 are formed.

Between the semiconductor laser device 1 and the photo detector 7, a 45° mirror 15 is disposed. The 45° mirror 15 reflects the emitted light IL emitted from the semiconductor laser device 1 in a direction perpendicular to the surface of the semiconductor integrated chip 13. A first diffraction device 2 is disposed on a lower face of the holographic optical element 9. The first diffraction device 2 divides the emitted light IL emitted from the semiconductor laser device 1 into a zero-order diffracted beam (a main beam) and plus/minus first-order diffracted beams (sub beams) for detecting the tracking shift. At one side of the semiconductor laser device 1, the side being opposite to the side of the semiconductor laser device 1 on which the 45° mirror 15 is disposed, an optical power monitoring photo detector 14 for sensing the optical power of the output of the semiconductor laser device 1 is disposed. At the same side of the semiconductor laser device 1, a signal processing circuit 17 for performing amplification and operation for an electric signal from the photo detector 7 is disposed around the photo detector 7.

The semiconductor integrated chip 13 is monolithically formed using a fabrication technique which is used, for example, for fabricating an IC (an integrated circuit) on an AlGaAs substrate. A groove for separating the semiconductor laser device 1 from the optical power monitoring photo detector 14 and the 45° mirror 15 are formed, for example, by wet etching. In a semiconductor crystal, by changing the used etchant, an etched face which is normal to a desired crystal orientation can be formed, and the 45° mirror with extremely high accuracy in an angle with respect to the optical axis of the laser light from the semiconductor laser device 1 and the flatness can be fabricated.

The holographic optical element 9 is formed into a rectangular parallelepiped shape using a glass substrate. On the upper face of the holographic optical element 9, a second diffraction device 3 as light splitting means for diffracting the reflected light LL from the recording medium 6 to lead the diffracted light to the photo detector 7 is formed. On the lower face of the holographic optical element 9, the first diffraction device 2 is formed. These diffraction devices 2 and 3 are formed by dry, etching, respectively. The holographic optical element 9 end the semiconductor integrated chip 13 are adhered with adhesive 22. By applying the adhesive 22 so as to airtightly seal any gap between the holographic optical element 9 and the semiconductor integrated chip 13, it is unnecessary to perform the airtight sealing using the conventional can package described above. This construction is an example of the present invention.

The holographic optical element 9 and the semiconductor integrated chip 13 are fabricated by the IC fabricating technique as described above. Accordingly, in the case where the surface area of the light emitting and receiving unit 16 is 5.5 mm², about 180 light emitting and receiving units 16 are simultaneously fabricated on the semiconductor substrate having a diameter of 3 inches. Moreover, when the semiconductor integrated chip 13 is provided with a through hole, an electrical connection to the semiconductor laser device 1, the photo detector 7 and the signal processing circuit 17 on the semiconductor integrated chip 13 can be realized from the back face of the semiconductor integrated chip 13, i.e., the lower face of the semiconductor integrated chip 13 shown in FIG. 3.

Figure 4:
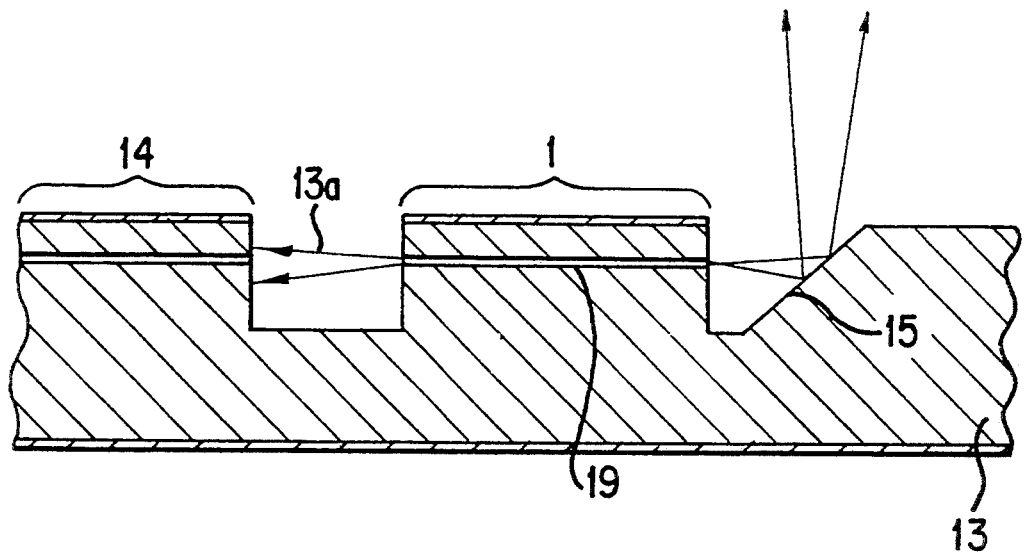
FIG. 4 is a partial cross-sectional view of a semiconductor integrated chip in the example.
Figure 5:
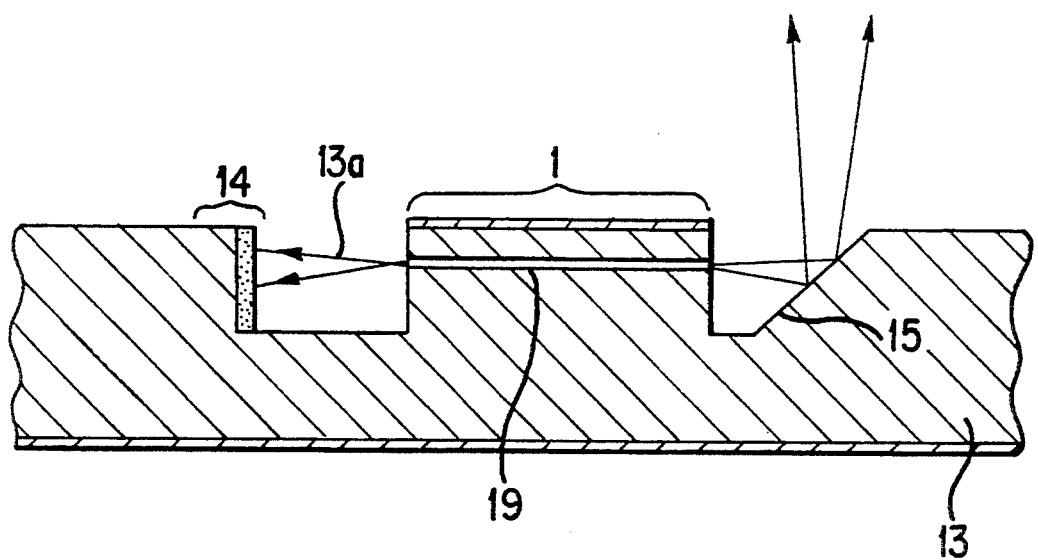
FIG. 5 is a partial cross-sectional view of another semiconductor integrated chip in the example.

FIGS. 4 and 5 show partial cross-sectional views of the semiconductor integrated chip 13, and show the specific construction of the monitoring photo detector 14. In the construction shown in FIG. 4, the monitoring photo detector 14 is formed at the same time as the formation of the semiconductor laser device 1. Thereafter, a groove 13a is formed in the semiconductor integrated chip 13 by etching. By this groove 13a, the semiconductor laser device 1 and the monitoring photo detector 14 are separated from each other. In the semiconductor integrated chip 13 having the above construction, the effective part of the monitoring photo detector 14 related to the photo-electric conversion corresponds to an active layer 19 of the semiconductor laser device 1 (the length measured vertically in FIG. 4 is 2 to 3 μm). An advantage of this construction is in that the working process is simple.

The structure shown An FIG. 5 is a modified example of the semiconductor integrated chip 13 shown in FIG. 4. In this construction, after the semiconductor laser device 1 is fabricated, the groove 13a is formed by etching or another method. Thereafter, the monitoring photo detector 14 is formed by obliquely implanting ions from the upper right of FIG. 5 with respect to the normal face of the groove 13a. The monitoring photo detector 14 mares an almost right angle with the optical axis of the laser light from the semiconductor laser device 1. When the above construction is adopted, the laser light generated from the semiconductor laser device 1 can be all received by the monitoring photo detector 14. Therefore, the photoelectric conversion efficiency of the monitoring photo detector 14 is improved as compared with the construction shown in FIG. 4.

In the optical pickup of this example, information is reproduced in the following manner, The emitted light IL from the semiconductor laser device 1 is reflected by the 45° mirror 15 and directed in a direction which is normal to the semiconductor integrated chip 13, i.e., the upward direction of FIG. 3. Then, the light is diffracted with the first diffraction device 2, so that the light is split into the zero-order diffracted beam (the main beam) and the plus/minus first-order diffracted beams (the sub beams) for detecting the tracking error and the focusing error. The respective diffracted beams pass through the second diffraction device 3, and then are converged on the optical disk 6 by the collimator lens 4 and the objective lens 5.

The reflected light LL from the optical disk 6 is taken into the optical system PS by the objective lens 5. Then, the light passes through the collimator lens 4 and is diffracted by the second diffraction device 3 and converged on the photo detector 7.

The second diffraction device 3 is divided into two diffraction gratings 3a and 3b by a dividing line DL. The photo detector 7 is divided into five portions by four dividing lines. The divided five portions correspond to five photo detective portions 7a, 7b, 7c, 7d and 7e. As in the photo detecting operation in the conventional optical pickup, the focusing error signal FES, the tracking error signal TES end an information signal RF are obtained based on the intensities of the diffracted beams incident on the photo detecting portions 7a to 7e.

In the optical pickup of this example, the semiconductor laser device 1 as the light generating means and the photo detector 7 are monolithically fabricated on the semiconductor integrated chip 13. Therefore, relative registration accuracy which is the same as the photo mask registration accuracy (about ±1 μm) can be obtained. Even in view of the occurrence of a plurality of errors in several working processes, the relative positional shift of the semiconductor laser device 1 and the photo detector 7 can be suppressed to several micrometers or lower. The value of the relative registration can be reduced to about one-tenth as compared with the conventional example in which the two devices are not fabricated on the same substrate. The offset component of the focusing error signal FES is caused by the relative positional shift of the semiconductor laser device 1 and the photo detector 7 in the assembling process. Therefore, when the positional shift is suppressed to one-tenth of the conventional example, the offset amount can be about 1 μm, whereby the offset compensation can be omitted in the optical pickup according to the present invention.

When restrict requirements for the focusing error signal FES exist, and the compensation for the focusing error signal FES is performed by adjusting the position of the second diffraction device 3, for example, only a reproduction signal from a single element among a plurality of light emitting and receiving units 16 which are fabricated on a 3-inch substrate is monitored to adjust the positions of all the elements on the substrate, whereby the positioning process can be greatly shortened.

Figure 6:
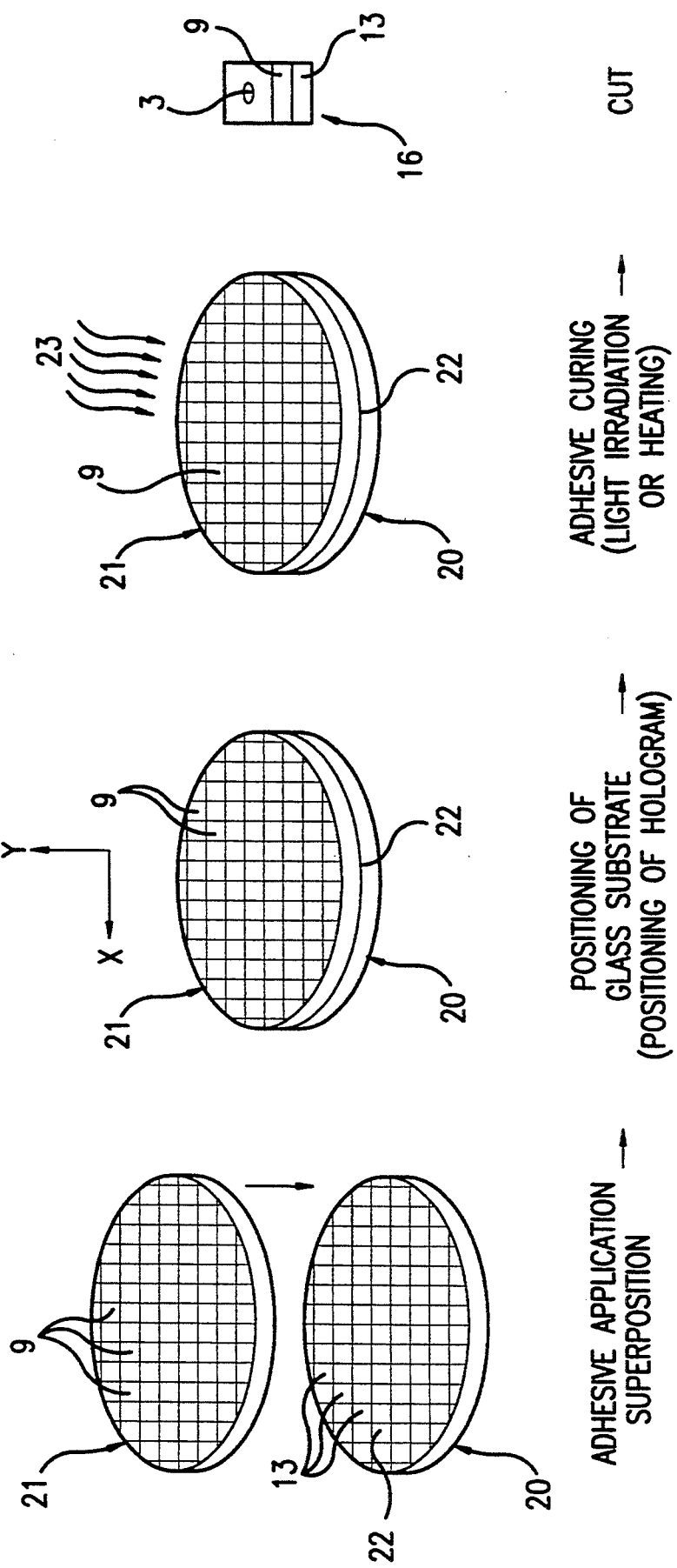
FIGS. 6A through 6D are perspective views illustrating an exemplary process for fabricating the light emitting and receiving unit according to the present invention.

FIGS. 6A through 6D show an example of a method of fabricating the light emitting and receiving unit 16 according to the present invention. In this method, as is first shown in FIG. 6A, the adhesive 22 is applied on a semiconductor substrate 20 on which a plurality of semiconductor integrated chips 13 are formed. As is shown in FIG. 6B, a glass substrate 21 on which a plurality of holographic optical elements 9 are formed is superimposed on the semiconductor substrate 20 and joined together. As the adhesive 22, an adhesive of a type which will not be immediately cured, for example, an adhesive of a ultraviolet cured type is used.

Next, by moving the entire glass substrate 21, the position of the second diffraction device 3 is adjusted. At this time, since the working error is uniform in the single glass substrate 21, by moving the entire glass substrate 21, the position of the second diffraction device 3 is adjusted while monitoring the reproduction signal from a single light emitting and receiving unit 16. As a result of the adjustment, the position of the second diffraction device 3 can be simultaneously adjusted with respect to all the light emitting and receiving units 16. After performing the positioning, as is shown in FIG. 6C, the adhesive 22 is cured by the irradiation of the ultraviolet rays 23 or the like. In the final step, as is shown in FIG. 6D, the respective light emitting and receiving units 16 are cut out. On a semiconductor having a diameter of 3 inches, about 180 light emitting and receiving units 16 can be fabricated, whereby the time period for positioning per one unit can be remarkably shortened.

In other words, since various working errors occur uniformly in a single substrate, the glass substrate 21 on which the holographic optical elements 9 are attached is moved as a whole, by monitoring the reproduction signal from a single light emitting and receiving unit 16, so that the position of the second diffraction device 3 is adjusted. Then, the light emitting and receiving units 16 on the semiconductor substrate 20 are cut out after the glass substrate 21 is adhered to the semiconductor substrate 20 with adhesive 22. As described above, 180 light emitting and receiving units 16 can be fabricated in the semi-conductor substrate 20 having a diameter of 3 inches, so that the time required for positioning per one unit can be greatly shortened.

Figure 8:
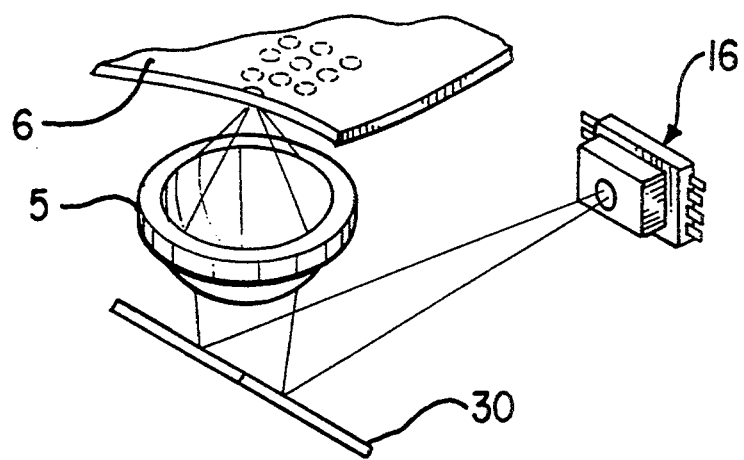
FIG. 8 is a perspective view showing the whole construction of the optical pickup in the second example.

A second example of an optical pickup in an optical information reproducing apparatus of the invention will be described below. The optical pickup of this example is similar to the optical pickup of the first example, so that the same components are indicated by the same reference numerals. The optical pickup of this example, as is shown in FIG. 8, includes an objective lens 5 which is disposed below an optical recording medium such as an optical disk 6, and a light emitting and receiving unit 16 for emitting light to the objective lens 5 via a reflective mirror 30 which is disposed below the objective lens 5. The light emitted from the light emitting and receiving unit 16 is reflected by the reflective mirror 30. The reflected light is incident on a recording face of the optical disk 6 in a proper focal condition by the objective lens 5. The light incident on the recording face of the optical disk 6 is reflected by the recording face. The reflected light goes back along the same path as in the emitted light from the light emitting and receiving unit 16 and reaches the light emitting and receiving unit 16.

Figure 7:
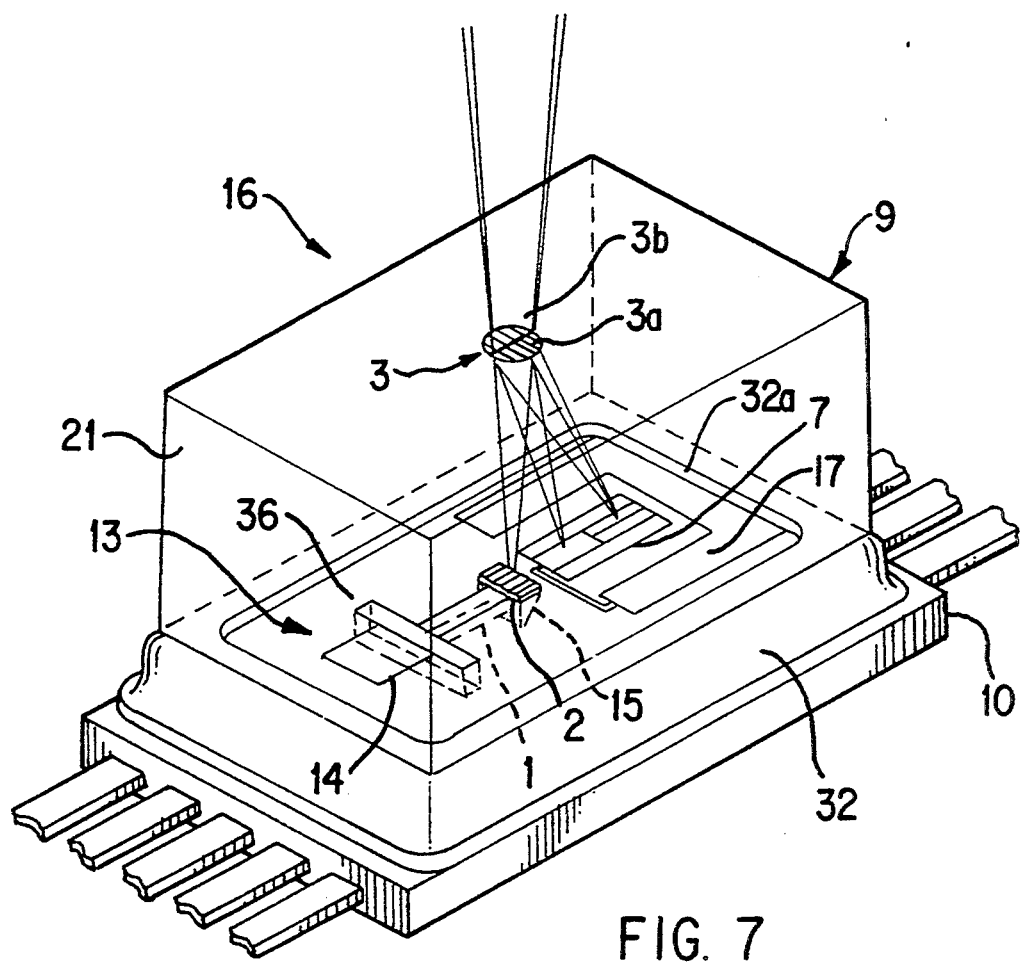
FIG. 7 is a perspective view showing a light emitting and receiving unit in an optical pickup of a second example according to the present invention.

The light emitting and receiving unit 16, as is shown in FIG. 7, includes a ceramic substrate 10 having a long plate shape, a semiconductor integrated chip 13 which is provided on the ceramic substrate 10, a metal cover 32 which has an opening 32a for exposing the upper face of the semiconductor integrated chip so as to cover a peripheral portion of the semiconductor integrated chip 13, and a holographic optical element 9 made of a transparent glass substrate which is mounted on the cover 32.

Figure 9:
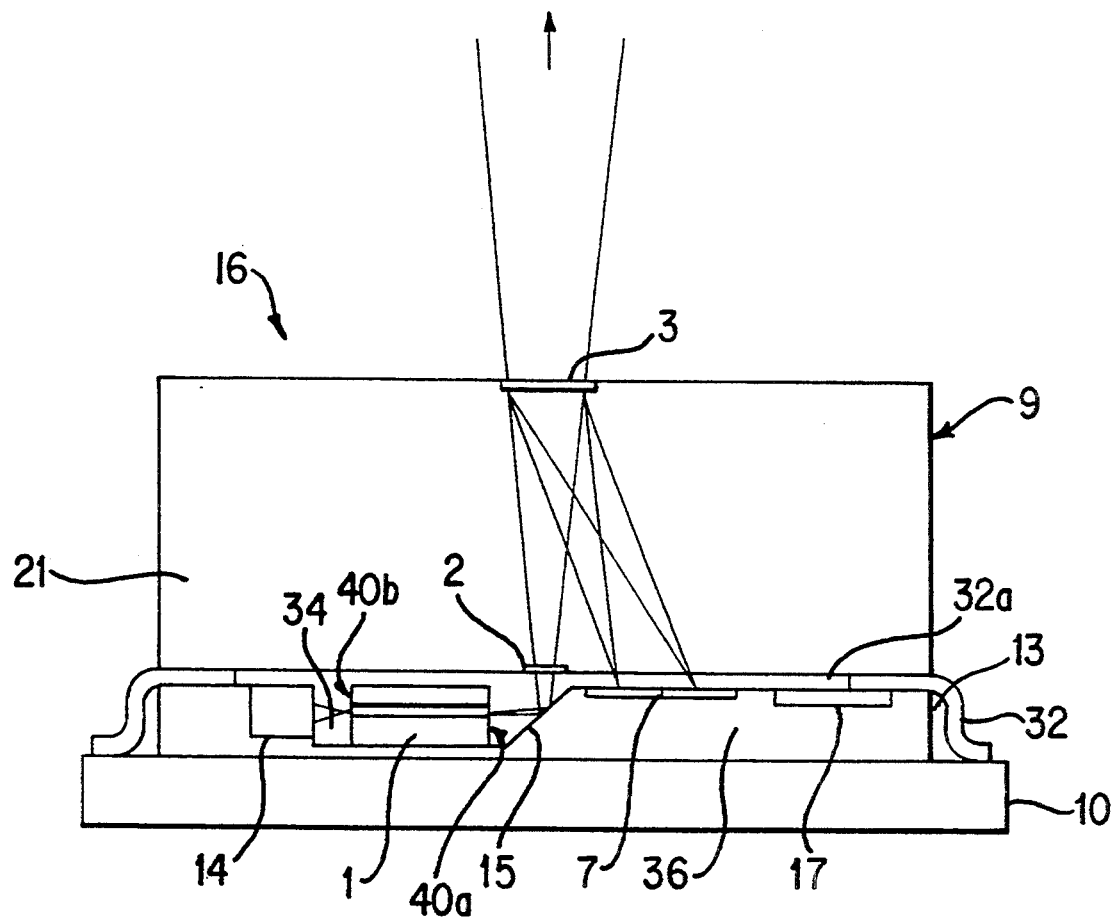
FIG. 9 is a vertical cross-sectional view of the light emitting and receiving unit.
Figure 10:
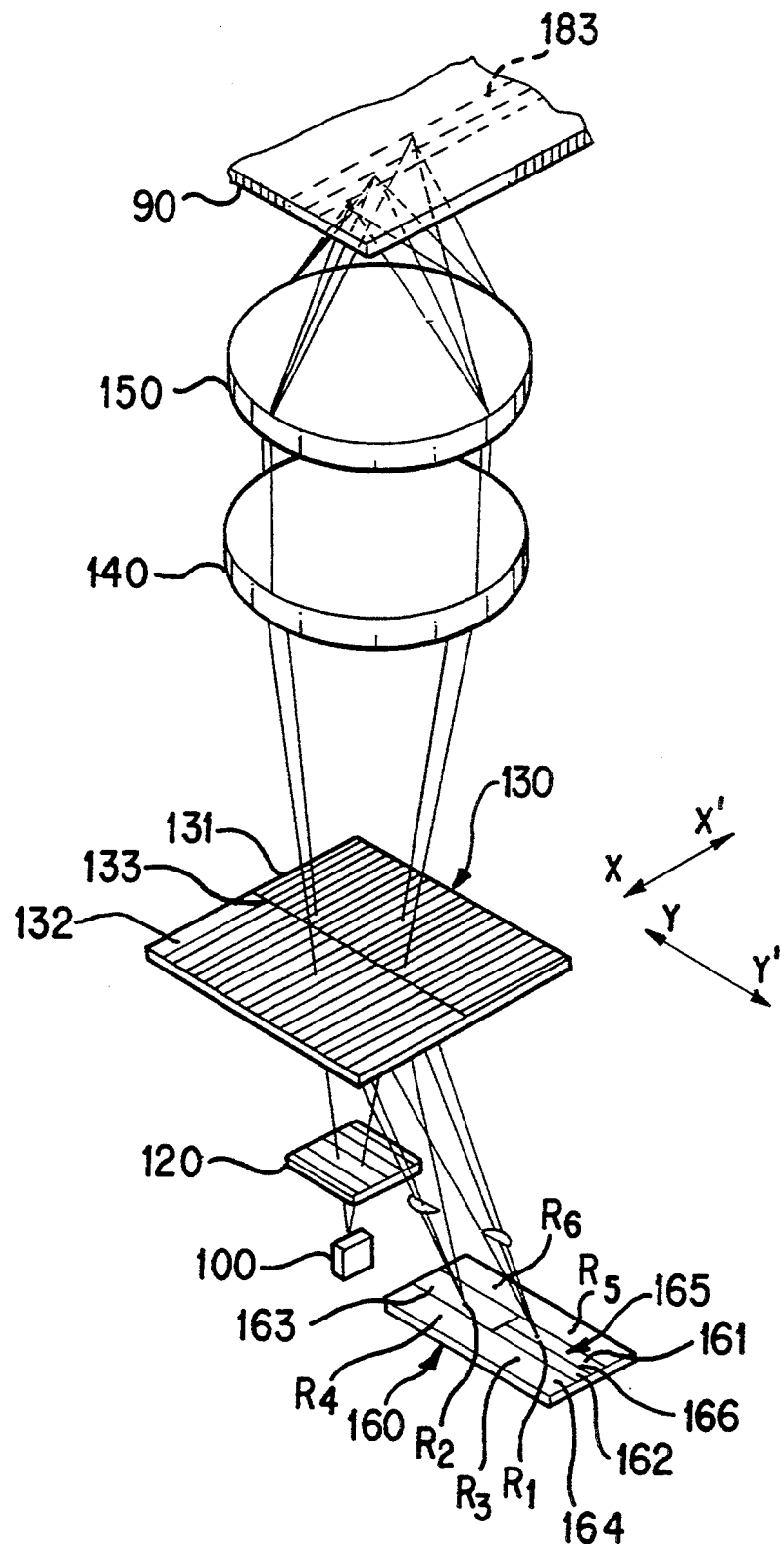
FIG. 10 is a perspective view showing the construction of a conventional optical pickup.
Figure 11A:
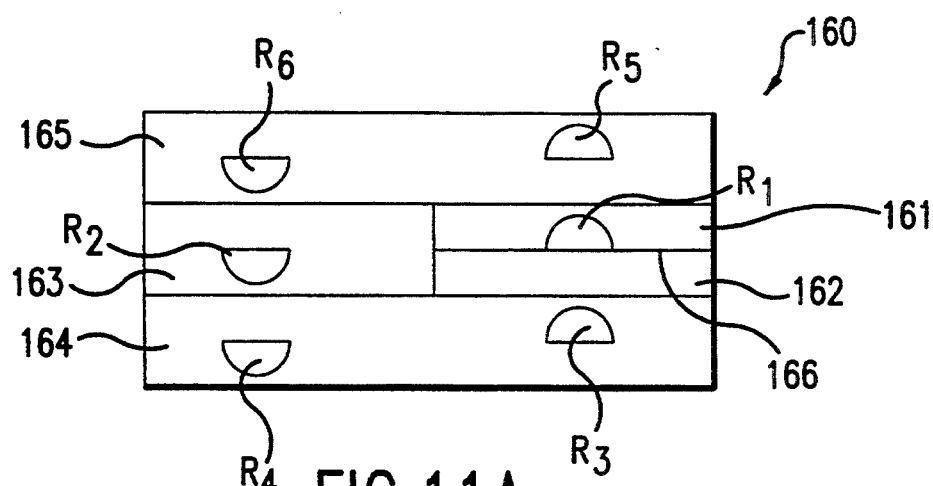
FIGS. 11A to 11C are plan views showing the states of converged light spots on light receiving devices, respectively.
Figure 11B:
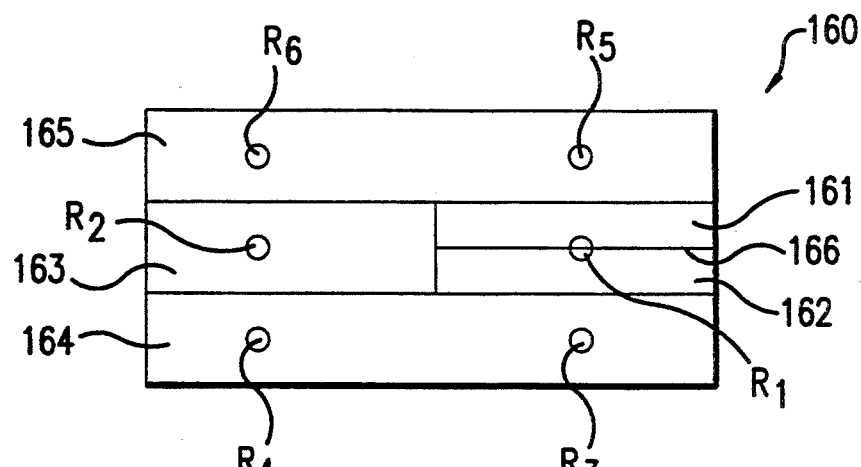
Figure 11C:
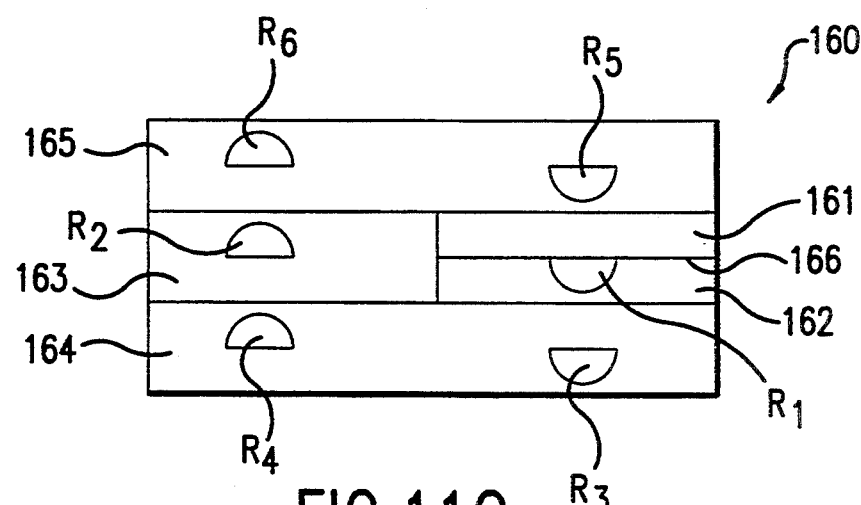
Figure 12C:
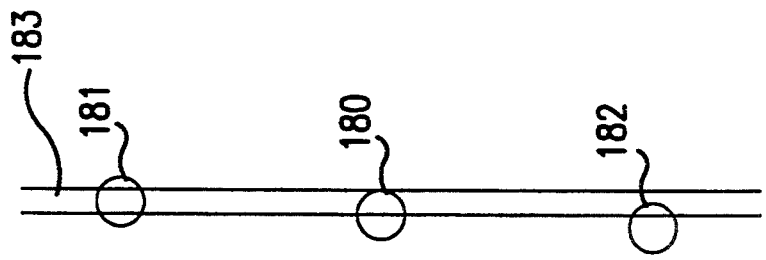
FIG. 12A to 12C are plan views showing the states of light spots for tracks of an optical recording medium, respectively.
Figure 12B:
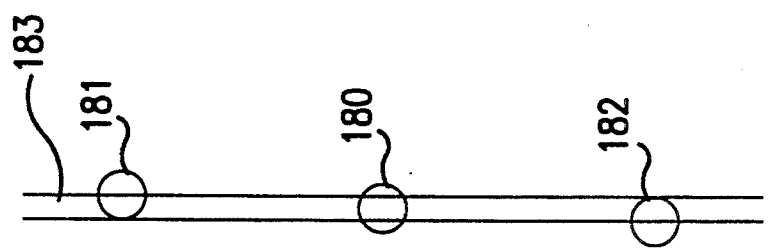
Figure 12A:
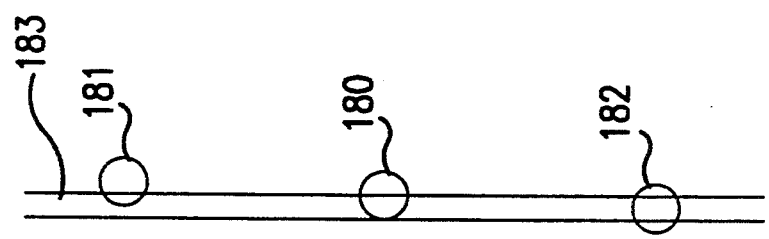
Figure 13:
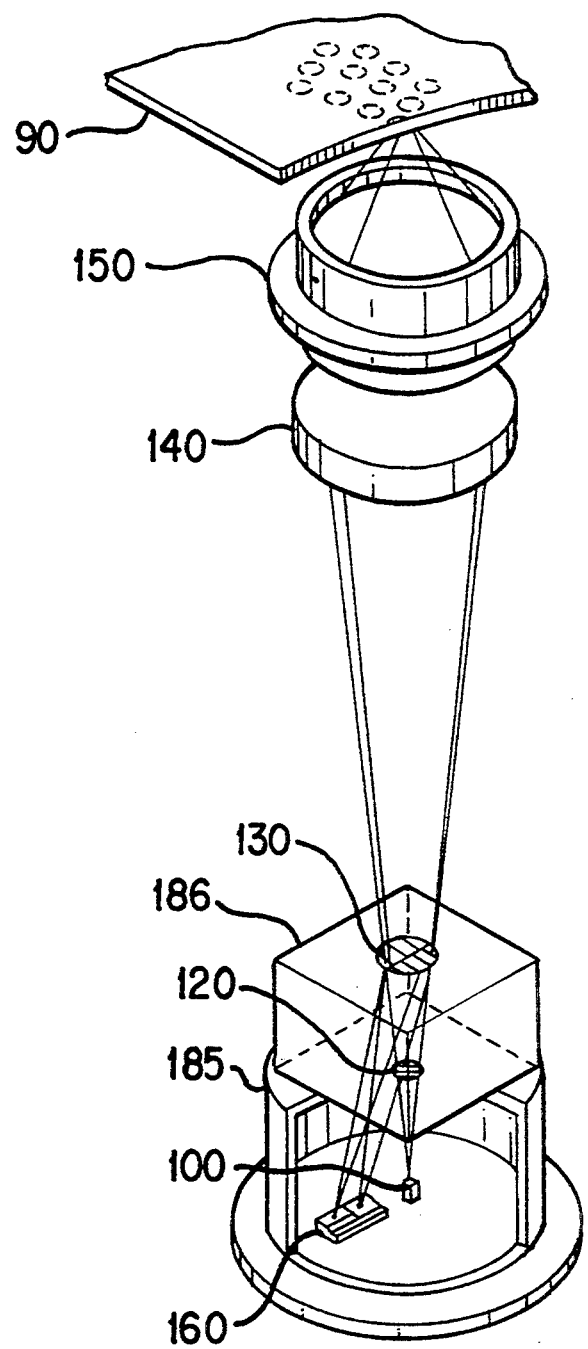
FIG. 13 is a perspective view showing the construction of a conventional optical pickup.
Figure 14:
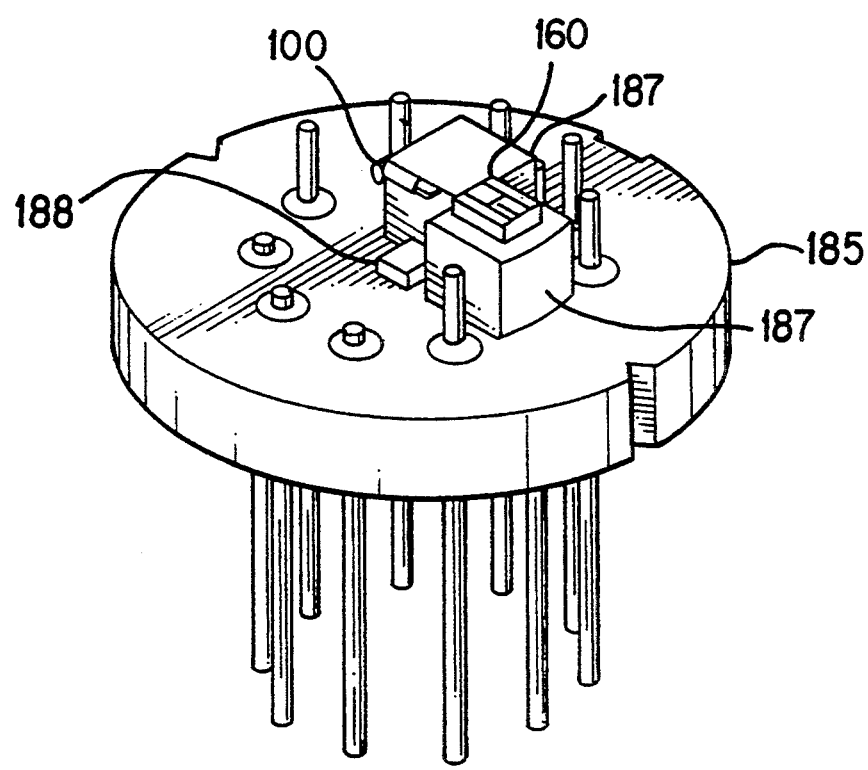
FIG. 14 is a perspective view showing a can package in the conventional optical pickup.

In the semiconductor integrated chip 13, a semiconductor laser device 1, a photo detector 7, a signal processing circuit 17 and the like are disposed on a silicon (Si) substrate 36 which is mounted on the ceramic substrate 10. The silicon substrate 36 has the same long plate shape as that of the ceramic substrate 10. As is shown in FIG. 9, in the middle portion of the silicon substrate 36 along the long axis in the direction along the longer side of the silicon substrate 36, a recessed portion 34 which extends along the long axis is formed. In the recessed portion 34, the semiconductor laser device 1 is located along the recessed portion 34 as the light source. The semiconductor laser device 1 emits laser light from the respective end faces in the direction along the longer side. One laser light emitting face 40a of the semiconductor laser device 1 is positioned in the vicinity of the center of the silicon substrate 36. The inside face of the recessed portion 34 which faces the emitting face 40a functions as a 45° mirror 15 for reflecting the laser light from the semiconductor laser device 1 to the holographic optical element 9. Also, in the recessed portion 34, a photo detector 14 is located in such a manner that the photo detector 14 faces the other laser light emitting face 40b of the semiconductor laser device 1. The photo detector 14 detects the intensity of the laser light in order to maintain the intensity of the laser light emitted from the semiconductor laser device 1 constant.

On the upper surface of the semiconductor integrated chip 13 which has continuity with the 45° mirror 15, the photo detector 7 and the signal processing circuit 17 are monolithically provided to the silicon substrate 36. The photo detector 7 detects the intensity of the laser light reflected by the optical disk 6 and outputs an electric signal corresponding to the detected intensity of the laser light. The signal processing circuit 17 performs amplification, wave shaping for the electric signal from the photo detector 7.

The recessed portion 34 of the semiconductor integrated chip 13 is formed by applying a known IC fabrication technique, for example, by wet-etching the silicon substrate 36. By appropriately selecting the kind of etchant used for the wet etching, an etched face normal to a desired crystal orientation can be formed. As a result, the 45° mirror 15 can be formed with high accuracy as to its angle. The semiconductor laser device 1 can be alternatively fabricated by any one of the following methods. In accordance with a first method, after the semiconductor laser device 1 is fabricated using a GaAlAs substrate independently of the silicon substrate 36, the semiconductor laser device 1 is mounted in the recessed portion 34 of the silicon substrate 36. In accordance with a second method, the semiconductor laser device 1 is fabricated by growing a GaAlAs layer including an active layer in the recessed portion 34 of the silicon substrate 36 using a heteroepitaxial growth method.

The registration of the semiconductor laser device 1 and the photo detector 7 is performed in the following manner. A marker for registration is formed on the semiconductor laser device 1, for example, from a resist layer or the like. While recognizing the marker by an image recognition method, the photo detector 7 is fabricated. As a result, the registration of semiconductor laser device 1 and the photo detector 7 is performed with the accuracy of ±several micrometers.

The semiconductor integrated chip mounted on the ceramic substrate 10 and protected by covering the peripheral portion of the semiconductor integrated chip 13 with the metal cover 32.

The holographic optical element 9 provided on the semiconductor integrated chip 13 is configured using the transparent glass substrate 21, and faces the upper face of the semiconductor integrated chip 13 via the opening 32a of the cover 32. The glass substrate 21 which constitutes the holographic optical element 9 has a lower face, i.e., the face opposite to the semiconductor integrated chip 13. On the lower face of the glass substrate 21, the rectangular first diffraction device 2 is provided on which the laser light reflected by the 45° mirror 15 is incident. The first diffraction device 2 splits the laser light emitted from the semiconductor laser device 1 and reflected by the 45° mirror 15 into a zero-order diffracted beam as a main beam used for information reading, and plus/minus first-order diffracted beams as sub beams for detecting the tracking error.

On the upper face of the holographic optical element 9, the second diffraction device 3 having a substantially circle shape is provided. On the second diffraction device 3, the laser light which is split into the zero-order diffracted beam and the plus/minus first-order diffracted beams is incident. The second diffraction device 3 is divided into two diffraction gratings 3a and 3b having substantially the same area. The laser light which illuminates the second diffraction device 3 in turn illuminates the optical disk 6 through the respective diffraction gratings 3a and 3b. The laser light reflected by the optical disk 6 is diffracted by the respective diffraction gratings 3a and 3b and the diffracted light is incident on the photo detector 7 which is provided on the semiconductor integrated chip 13.

The first diffraction device 2 and the second diffraction device 3 of the holographic optical element 9 is formed, for example, by dry-etching the upper and lower faces of the glass substrate 21 which constitutes the holographic optical element 9. The thus formed holographic optical element 9 is adhered on the cover 32 for protecting the semiconductor integrated chip 13 after adjusting the position with respect to the semiconductor integrated chip 13, in order to compensate the offset amount of the control signal obtained based on the intensities of the diffracted beams of the laser light reflected by the optical disk 6.

In the optical pickup having the abovementioned construction, the laser light emitted from the semiconductor laser device 1 is reflected by the 45° mirror 15 in a normal direction perpendicular to the semiconductor integrated chip 13. The light reflected by the 45° mirror 15 is split into the zero-order diffracted beam as the main beam and the plus/minus first-order diffracted beams as the sub beams for detecting the tracking error by the first diffraction device 2 of the holographic optical element 9.

The diffracted light passes through the glass substrate 21, and through the second diffraction device 3 provided on the upper face of the glass substrate 21, and is then reflected by the reflective mirror 30 toward the objective lens 5. The diffracted light through the objective lens 5 is converged on the recording face of the optical disk 6 by the objective lens 5. The converged light are reflected by the recording face.

The reflected light from the optical disk 6 passes through the objective lens 5 and is reflected by the reflective mirror 30. The reflected light is introduced into the second diffraction device 3 of the light emitting and receiving unit 16. The zero-order diffracted beam and the plus/minus first-order diffracted beams which are reflected by the optical disk 6 and introduced into the second diffraction device 3 are diffracted in the diffraction gratings 3a and 3b of the second diffraction device 3, respectively. The diffracted light is incident on the photo detector 7.

The photo detector 7, as is described above, is divided into five portions corresponding to the five photo detective portions 7a, 7b, 7c, d, and 7e. As in the photo detecting operation in the conventional optical pickup, the focusing error signal FES, the tracking error signal TES, and the information signal RF are obtained based on the optical intensities of the diffracted beams which are incident on the respective photo detective portions 7a-7e.

In the optical pickup of this example, as described above, the semiconductor laser device 1 is directly mounted in the recessed portion 34 of the semiconductor integrated chip 13 on which the photo detector 7 is provided. The semiconductor laser device 1 is mounted by adjusting the position thereof with respect to the semiconductor integrated chip 13 using the image recognition method. As a result, the registration error between the semiconductor laser device 1 and the photo detector 7 is reduced within ±several micrometers which is about one-tenth as compared with the prior art. Therefore, the offset amount of the control signal caused by the registration error of the semiconductor laser device 1 can be sufficiently reduced.

As a result, for a certain offset amount, the positioning of the holographic optical element 9 is not required. Alternatively, even if the positioning of the holographic optical element 9 is required, the distortion of the detected control signal is reduced in the case where the position of the holographic optical element 9 is adjusted in order to compensate the offset amount of the control signal. In the case where the position of the holographic optical element 9 is required to be adjusted, only the reproduction signal from a single light emitting and receiving unit 16 among a plurality of light emitting and receiving units 16 fabricated on the semiconductor substrate 20 shown in FIGS. 6A to 6D is monitored. Therefore, the positioning with respect to all the light emitting and receiving units 16 on the semiconductor substrate 20 can be simultaneously performed. As a result, the mass productivity of the optical pickup of this example is improved and the cost thereof is lowered while the high quality thereof can be attained.

In the optical pickup of this example, as described above, the laser light emitted from the semiconductor laser device 1 which is provided on the recessed portion 34 of the semiconductor integrated chip 13 illuminates the optical disk 6 via the optical system PS. The laser light reflected by the optical disk 6 is received by the photo detector 7 which is integrally formed on the semiconductor integrated chip 13 via the optical system PS. By constructing the optical pickup as describe above, the optical pickup is reduced in size and weight as a whole. Moreover, the registration between the semiconductor laser device 1 and the photo detector 7 can readily be performed.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical information reproducing apparatus comprising a light emitting and receiving unit and an optical system,
   wherein said optical system converges light from said light emitting and receiving unit onto a recording medium and converges said light after said light is reflected by said recording medium, and
   wherein said light emitting and receiving unit includes:
   light generating means disposed on a substrate for generating said light;
   photo detecting means formed, integrally with said substrate, on said substrate on which said light generating means is disposed, for detecting said light reflected by said recording medium and for outputting a signal corresponding to the intensity of light incident thereon; and
   light diffraction means provided on an optical axis of said reflected light, said light diffraction means leading part of said reflected light directly to said photo detecting means, said light diffraction means being mounted on said substrate with an adhesive, whereby said light generating means and said photo detecting means are airtightly sealed.

2. An optical information reproducing apparatus according to claim 1, wherein said light generating means is monolithically formed on said substrate.

3. An optical information reproducing apparatus according to claim 1, wherein said optical information reproducing apparatus includes a signal processing circuit for processing said signal output from said photo detecting means, said signal processing circuit being fabricated monolithically with said light generating means and said photo detecting means on said substrate.

4. An optical information reproducing apparatus according to claim 1, wherein said optical information reproducing apparatus includes a light intensity sensing means for receiving part of said light from said light generating means to sense the intensity of said light from said light generating means, said light intensity sensing means being fabricated monolithically with said light generating means and said photo detecting means on said substrate.

5. An optical information reproducing apparatus according to claim 1, wherein said substrate is a semiconductor substrate.

6. An optical information reproducing apparatus according to claim 5, wherein said semiconductor substrate is made of a material selected from Si and AlGaAs.

7. An optical information reproducing apparatus according to claim 1, wherein said optical information reproducing apparatus includes reflecting means for reflecting said light from said light generating means in a direction perpendicular to a surface of said substrate.

8. An optical information reproducing apparatus according to claim 7, wherein said reflecting means is monolithically formed on said substrate.

9. An optical information reproducing apparatus according to claim 1, wherein said substrate has a recessed portion and said light generating means is disposed in said recessed portion of said substrate.

10. An optical information reproducing apparatus according to claim 9, wherein said substrate,is integrally provided with a signal processing circuit for receiving said signal output from said photo detecting means.

11. An optical information reproducing apparatus according to claim 9, wherein said substrate has light intensity sensing means for receiving part of said light from said light generating means to sense the intensity of said light from said light generating means, said light intensity sensing means being monolithically fabricated on said substrate.

12. An optical information reproducing apparatus according to claim 9, wherein said light generating means is located in said recessed portion of said substrate at a position for emitting said light toward the inner face of said recessed portion of said substrate, said inner face of said recessed portion to which said light is emitted being formed as a reflective face for reflecting said light at a predetermined reflective angle with respect to a direction in which said light radiates.

13. An optical information reproducing apparatus according to claim 1, wherein said light diffraction means includes a first diffraction device and a second diffraction device which are formed on a glass substrate, said glass substrate having a pair of surfaces facing each other, said first diffraction device being formed on one of said surfaces of said glass substrate and said second diffraction device being formed on the other of said surfaces of said glass substrate.

14. An optical information reproducing apparatus according to claim 13, wherein said glass substrate adheres to said substrate on which said light emitting means and said photo detecting means by means of an adhesive.

15. An optical information reproducing apparatus according to claim 1, wherein said light diffraction means includes a transparent substrate having a face on which a light diffraction member is formed.

16. An optical information reproducing apparatus according to claim 15, wherein said transparent substrate of said light diffraction means has another face which is opposed to said face, said another face of said transparent substrate facing said light generating means.

17. An optical information reproducing apparatus according to claim 16, wherein said light diffraction member is a diffraction grating.

18. An optical information reproducing apparatus according to claim 16, wherein another light diffraction member for splitting light generated by said light generating means into three beams is formed on said another face of said transparent substrate.

19. An optical information reproducing apparatus according to claim 1, wherein said apparatus is mounted on an insulating substrate.

20. An optical information reproducing apparatus according to claim 19, wherein said insulating substrate is a ceramic substrate.

21. A method of manufacturing a plurality of light emitting and receiving units, each of said light emitting and receiving units being used in an optical information reproducing apparatus, said method comprising the steps of:

(A) monolithically forming, on a semiconductor substrate, a plurality of light generating means for generating light and a plurality of photo detecting means each for detecting light reflected by a recording medium and outputting a signal corresponding to the intensity of light incident thereon, said plurality of photo detecting means being disposed adjacently to said plurality of said light generating means;

(B) mounting, on said semiconductor substrate, a light diffraction member including a plurality of light diffraction devices formed therein by which said light generated from said plurality of light generating means is diffracted and emitted, and by which the incident light is diffracted to illuminate said plurality of photo detecting means, respectively; and (C) adjusting distances between said plurality of light diffraction devices and said plurality of light generating means, and distances between said plurality of light diffraction devices and said plurality of photo detecting means, by moving said light diffraction member, respectively.

22. A method of manufacturing an optical information reproducing apparatus according to claim 21, wherein said light generating means is formed by a heteroepitaxial growth method.

23. A method of manufacturing a plurality of light emitting and receiving units, each of said light emitting and receiving units being used in an optical information reproducing apparatus, said method comprising the steps of:

(A) monolithically forming, on a semiconductor substrate, a plurality of photo detecting means each for detecting light reflected by a recording medium and outputting a signal corresponding to the intensity of said light incident thereon;

(B) providing, on said semiconductor substrate, a plurality of light generating means for generating light, said plurality of light generating means is disposed adjacently to said plurality of photo detecting means, respectively;

(C) mounting, on said semiconductor substrate, a light diffraction member including a plurality of light diffraction devices formed therein by which said light generated from said plurality of light generating means are diffracted and emitted, and by which the incident light is diffracted to illuminate said plurality of photo detecting means, respectively; and (D) adjusting distances between said plurality of light diffraction devices and said plurality of light generating means, and distances between said plurality of light diffraction devices and said plurality of photo detecting means, by moving said light diffraction member, respectively.

* * * * *